Patented June 23, 1925.

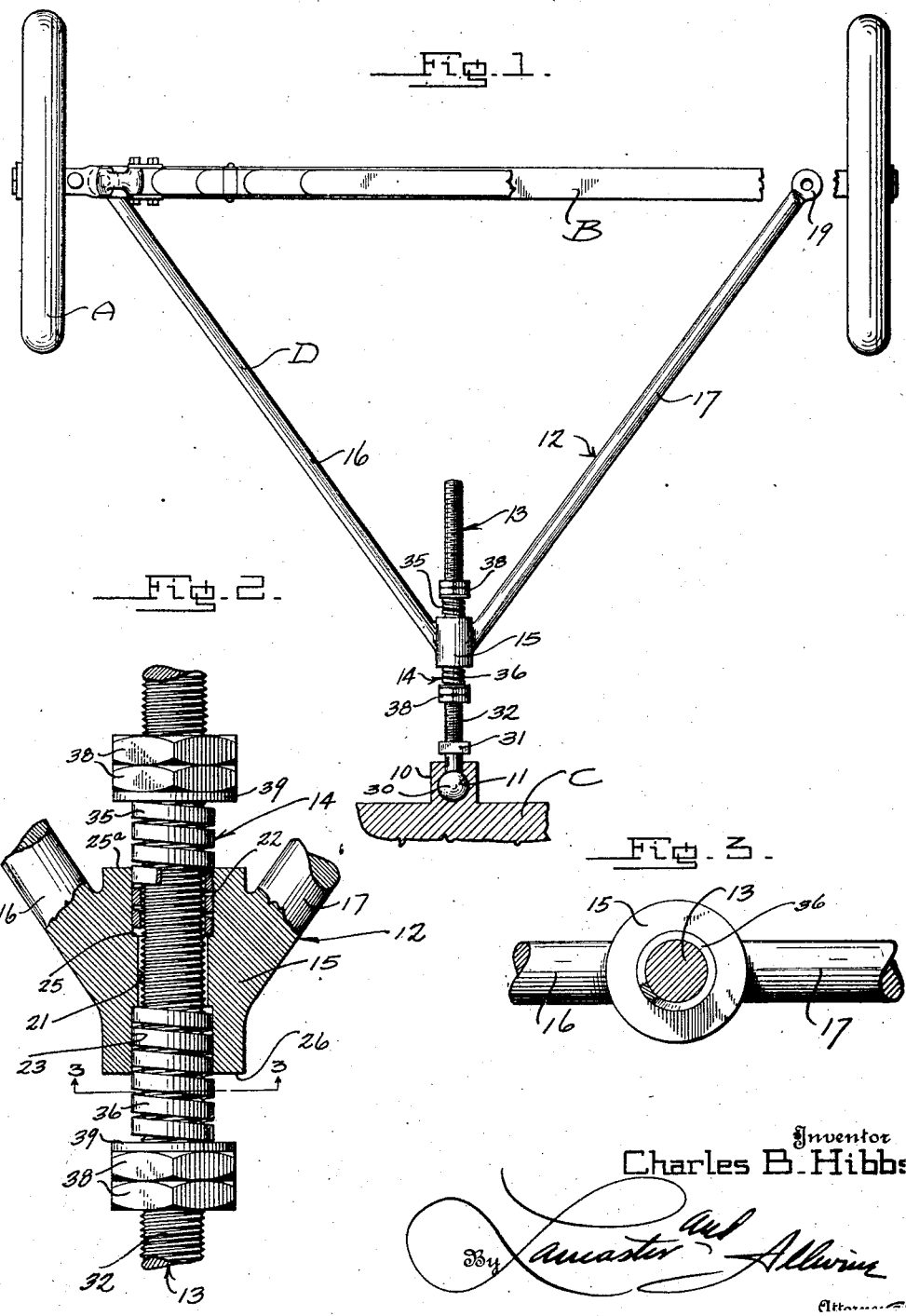

1,543,567

UNITED STATES PATENT OFFICE.

CHARLES B. HIBBS, OF NEWPORT, NORTH CAROLINA.

RADIUS ROD FOR AUTOMOTIVE VEHICLES.

Application filed May 2, 1922. Serial No. 557,823.

*To all whom it may concern:*

Be it known that I, CHARLES B. HIBBS, a citizen of the United States, residing at Newport, in the county of Carteret and State of North Carolina, have invented certain new and useful Improvements in Radius Rods for Automotive Vehicles, of which the following is a specification.

This invention relates to an improved radius rod arrangement for flexibly mounting the axles of vehicles.

The primary object of this invention is the provision of a novel type of adjustable means for resiliently mounting the radius rods of automotive vehicles.

An important object of this invention is the provision of a radius rod, specifically adapted for use with the axle assembly of motor vehicles, including an improved arrangement for adjustably mounting the radius rod remote from its connection with the vehicle axle, so that shocks and vibrations incident to travel of the vehicle will be buffed, in order that there will be no liability of injury to the radius rod or vehicle parts by reason of shocks or vibrations.

Other objects and advantages will be apparent during the course of the following detailed description.

In the accompanying drawing, forming a part of this specification, and wherein similar reference characters designate corresponding parts throughout the several view, Figure 1 is a plan view of the improved radius rod arrangement, showing the manner in which the same is used in connection with the connecting part of a motor vehicle.

Figure 2 is an enlarged fragmentary view, partly in section, showing the manner in which the radius rod is yieldably and adjustably connected.

Figure 3 is a fragmentary cross sectional view, taken substantially on the line 3—3 of Figure 2.

In the drawing, wherein for the purpose of illustration is shown the preferred embodiment of this invention, the letter A designates a motor vehicle, including an axle B; a support C; and having the improved radius rod arrangement D associated therewith for stabilizing the mounting of the axle B.

The radius rod arrangement D will ordinarily be connected to the front axle of a motor vehicle, and will find its most universal application upon "Ford" motor vehicles. Consequently, it is preferred that the axle B be the front axle, and the support C above referred to is preferably the ordinary internal combustion engine provided with the vehicle A, and which is provided with the boss 10 thereon, having the spherical shaped socket 11 therein.

The radius rod arrangement D preferably includes the rod member 12; oscillating bolt 13; and adjustable means 14 for connection of the radius rod member 12 to the bolt 13.

The radius rod member 12 is of V-shaped formation including the cylindrical shaped connection 15 upon which the legs 16 and 17 are integrally formed, and diverge therefrom. The free ends of the legs 16 and 17 are flattened and apertured as at 19 for suitable attachment to the ends of the axle C in any approved manner. The cylindrical shaped connection 15 formed at the juncture of the legs 16 and 17 is preferably a forging, and provided with the passageway 21 therethrough. The passageway 21 is enlarged as at 22 and 23 upon the ends of the cylindrical connection 15; said enlarged portions 22 and 23 of the passageway 21 opening upon the forward and rear faces 25ª and 26 respectively of the said connection 15, and being provided in order that certain portions of the yieldable means 14 may be disposed in the enlarged portions 22 and 23 to rest upon abrupt shoulders 25, and which will be more fully described hereinafter.

The bolt 13 of the improved radius rod arrangement 15 is preferably provided with a ball bearing head 30 upon one end thereof, which is adapted for universal oscillatory mounting in the socket 11 of the support boss 10. A polygonal shaped head 31 is preferably provided upon the bolt 13 adjacently positioned with respect to the ball 30, said head being an integral part of the bolt 13 and preferably of square formation for receiving a wrench. The stem 32 of the bolt 13 from the head 31 to the free end thereof is screw threaded, in order that the same may receive the adjusting means 14. In the mounting of the bolt member 13 upon the support C, the ball 30 is suitably clamped in the socket 11 of the boss 10 hereinbefore mentioned, so that the head 31 is disposed exteriorly of the boss 10, in order that an operator may engage the same with a wrench. In position, the screw threaded stem 32 of the bolt 13 is reciprocably disposed through the passageway 21 of the radius rod connection portion 15. The adjusting means 14 cooperates with the stem 32 within the passageway 21, so that, the screw threads of the stem 32 may be free of contact with the sides of the passageway 21 in order that the radius rod member 12 may be reciprocated with respect to the bolt member 13.

Referring to the yieldable adjusting means 14, the same preferably includes a pair of spiral springs 35 and 36, which are adapted for respective disposition in the socket portions 22 and 23 of the radius rod connecting portion 15. The springs 35 and 36 are durably constructed, and are preferably of the spiral type, being formed of material, which is polygonal in cross section, so that the exterior surface of the convolutions of said spiral springs are relatively flat in order that they may bear against the interior surfaces of the passageway socket portions 22 and 23, so that said springs may properly support the screw threaded shank portion 32 free of contact with the passageway 21, in order to prevent mutilation of the screw threads of the bolt member 13. A pair of relatively thin adjusting nuts 38 are provided for cooperation with each of the springs 35 and 36; a washer 39 likewise being provided with each of the pairs of nuts 38, so that said washer 39 may bear against the end of the spring which is disposed exteriorly of the radius rod connection portion 15. By this arrangement, the nuts 38 may be adjusted longitudinally of the screw threaded stem portion 32, so that the springs 35 and 36 may be compressed for holding the cylinder portion 15 in any suitable position upon the bolt 13. Due to the fact that a pair of nuts 38 are provided for each spring, said nuts may be securely locked in a determined location upon the bolt 13, as can be readily understood.

In assembling, the radius rod member 12 is, of course, secured to the axle B in any approved manner. The bolt member 13 is likewise oscillatively secured in the boss 10. The inner nuts 38, washer 39, and spiral spring 36 are next disposed upon the screw threaded portion of the bolt 13 and placed in a determined relation. The cylindrical portion 15 of the radius rod arrangement 12 may then be disposed over the end portion 32 of the bolt 13, so that the spiral spring 36 is disposed in the socket portion 23 of the passageway 21 to rest upon the shoulder 25 therein. The spiral spring 35 may then be assembled upon the outer end of the bolt end 32 and clamped in the socket 22 provided therefor, so that the same rests upon the annular shoulder 25. The nuts 38 may then be adjusted so that the spiral springs 35 and 36 are properly compressed for resiliently holding the radius rod member 12 for proper alignment of the axle B.

In use, shocks and vibrations upon the axle B will be transmitted to the springs 35 and 36, where said shocks and vibrations will be buffed.

From the foregoing, it can be seen that an improved radius rod for motor vehicles has been provided, which is of novel construction, in that a superior arrangement has been provided in the fact that shocks and vibrations will not be directed into the boss 10 of the support B, as is the case of many types of radius rod arrangements now found upon the market. In addition to the adjustment and resiliency with which the radius rod arrangement stabilizes action of the axle B, the improved device is an economical one, in that wear upon any part will only necessitate a renewal of that one part, which can readily be accomplished due to the detachable and adjustable arrangement of the parts of this improved device.

Various changes in the shape, size and arrangement of parts, may be made to the form of invention herein shown and described, without departing from the spirit of the invention or the scope of the claims.

I claim:

1. In combination with an axle and a support, a bolt member pivotally connected at an end thereof to said support and being screw threaded inwardly from its opposite end, a radius rod connected to said axle and having a sleeve at the opposite end thereof provided with a passageway therethrough adapted to slidably and loosely receive the screw threaded portion of said bolt, said sleeve passageway inwardly from the opposite ends of said sleeve being enlarged to provide annular seats facing toward the opposite ends of said sleeve, nuts in threaded engagement with said bolt at opposite ends of said sleeve, and spiral compression springs about said bolt at opposite ends of said sleeve the end portions of said springs seating within the passageway of said sleeve against the seats in said sleeve, said springs being under compression between their seats and said nuts.

2. In a radius rod attachment of the class described the combination of a bolt having screw threads inwardly from an end thereof, a radius rod provided with an apertured sleeve thereon, the aperture of said sleeve being provided to slidably and loosely receive the screw threaded portion of said bolt, said sleeve short distances inwardly from opposite ends thereof having the aperture enlarged to provide annular seats, a pair of lock nuts in threaded engagement with said bolt at each end of said sleeve, and spiral compression springs disposed at opposite ends of said sleeve, said springs receiving the bolt therethrough and extending into the enlarged end portions of the aperture of the sleeve and abutting against the seats in said aperture, said pairs of nuts being adjusted on said bolt to compress the springs between the nuts and the sleeve for the purpose of resiliently supporting the sleeve of the radius rod and the bolt in a non-engaging relation.

CHARLES B. HIBBS.